(12) United States Patent
Shook

(10) Patent No.: US 10,144,248 B2
(45) Date of Patent: Dec. 4, 2018

(54) BICYCLE COASTING MECHANISM

(76) Inventor: William Shook, Tampa, FL (US)

( * ) Notice: Subject to any disclaimer, the term of this patent is extended or adjusted under 35 U.S.C. 154(b) by 2016 days.

(21) Appl. No.: 12/380,919

(22) Filed: Mar. 5, 2009

(65) Prior Publication Data

US 2010/0224458 A1    Sep. 9, 2010

(51) Int. Cl.
  *F16D 41/066* (2006.01)
  *B60B 27/04* (2006.01)
  *B60B 27/02* (2006.01)

(52) U.S. Cl.
  CPC .......... *B60B 27/047* (2013.01); *B60B 27/023* (2013.01)

(58) Field of Classification Search
  CPC ................................. B60B 27/047
  USPC .......................... 192/64; 384/545; 301/110.5
  See application file for complete search history.

(56) References Cited

U.S. PATENT DOCUMENTS

| | | | | |
|---|---|---|---|---|
| 1,429,196 | A * | 9/1922 | Dughera | 192/64 |
| 2,352,911 | A * | 7/1944 | Osplack | 384/126 |
| 2,724,624 | A * | 11/1955 | Barr | 384/492 |
| 4,938,610 | A * | 7/1990 | Kato | 384/126 |
| 5,048,358 | A | 9/1991 | Shook | |
| 5,301,778 | A | 4/1994 | Haeussinger | |
| 5,332,294 | A | 7/1994 | Haeussinger | |
| 5,676,227 | A | 10/1997 | Hugi | |
| 5,899,539 | A | 5/1999 | Lin et al. | |
| 5,921,363 | A | 7/1999 | Chiang et al. | |
| 5,964,332 | A | 10/1999 | King | |
| 6,155,394 | A | 12/2000 | Shook | |
| 6,264,575 | B1 * | 7/2001 | Lim et al. | 474/77 |
| 6,374,975 | B1 | 4/2002 | Schlanger | |
| 6,401,895 | B1 | 6/2002 | Chen | |
| 6,478,128 | B2 | 11/2002 | Taylor | |
| 6,497,314 | B2 * | 12/2002 | Kanehisa | 192/64 |
| 6,523,660 | B1 | 2/2003 | Chen | |
| 7,059,686 | B2 | 6/2006 | Kanehisa | |
| 7,252,344 | B2 | 8/2007 | Mercat et al. | |
| 7,445,105 | B2 | 11/2008 | French | |
| 2002/0072446 | A1 * | 6/2002 | Kanehisa et al. | 475/269 |
| 2007/0089960 | A1 * | 4/2007 | Kanehisa | 192/64 |

* cited by examiner

*Primary Examiner* — Robert W Hodge
(74) *Attorney, Agent, or Firm* — David C. Purdue

(57) ABSTRACT

The present invention is directed to a torque transmitting bicycle freewheel coasting mechanism comprising a drive body, a driven body and rolling bearing elements supporting and spacing these bodies during coasting. The rolling element bearings are elastically deformable and, during the application of a sufficiently large driving force to the drive body, they deform to allow relative movement between the bodies to bring one body into contact with the other body. This movement is small and the load is carried directly from one body to the other body without damage to the rolling element bearings. The bodies are only highly loaded by drive loads during torque transmission. During coasting, the flexible balls or rollers spring back and support the bodies in a spaced relationship in a normal bearing fashion. The flexible rolling bearing elements are not hard so bearing raceways can be formed directly into the bodies.

18 Claims, 2 Drawing Sheets

BICYCLE COASTING MECHANISM

BACKGROUND OF THE INVENTION

1. Field of the Invention

The present invention relates to a coasting or freewheel mechanism for use in a bicycle, and more particularly to a light weight and low cost coasting mechanism.

2. Description of Related Art

A bicycle uses a coasting mechanism, sometimes called a freewheel mechanism, to alternately link and detach the driving force of the pedals and the rear wheel of the bicycle. Many years ago, the pedals and the rear wheel were directly linked, so that the pedals rotated whenever the wheel turned. However, it was found to be desirable to include a mechanism which permits the bicycle to "coast", i.e., to have the wheel turn without the pedals turning. This coasting action has traditionally been accomplished through the use of pawls and ratchet teeth which are held in close coaxial alignment by steel ball bearings. Bushings have also been tried, in place of ball bearings, but with limited success because of the requirement for both free running and close axial alignment for the ratchet pawls to work correctly. The steel rolling element bearings allow free running during coasting but must support the high force loads encountered during application of driving force. Bushings do not work well when contaminated and especially when using small clearances to hold coaxial alignment. Seals to prevent contamination also introduce excessive drag, but inadequate seals allow contamination with increased wear and drag. Through time, the rolling element steel ball bearings have been accepted as the best current solution. The drawbacks to the steel ball bearings are the weight and the cost, as well as the size constraints of fitting these bearings into the available space to meet the prevailing industry standards for the mating parts.

There remains a need for a coasting mechanism that is free running, like the steel ball bearing system, does not transfer the high force loads generated during application of driving force through the ball bearings but, rather, acts like the bushing systems during driving by transferring the loads directly, when no free rotation is required. It is also desirable that the cost of the coasting mechanism be as low as possible and that the mechanism be as light weight as possible, while still being sturdy and reliable. Certainly, to be accepted, this needed mechanism must be lower cost and/or lighter weight than the current alternatives in the marketplace. The present invention is a coasting mechanism which includes these and other important features.

SUMMARY OF THE INVENTION

The present invention relates to a bicycle coasting mechanism or freewheel mechanism. This mechanism provides for driving engagement of a drive body with a driven body, typically a hub body, which supports a bicycle wheel. However, when the rotational speed of the drive body is less than that of the driven body, this mechanism disengages the drive body from the driven body. The drive body in a bicycle typically receives driving force which is input to the system through pedals and transmitted to the drive body through a chain or even a belt. When the driving force input to the drive body causes it to try to rotate faster than the driven body is rotating, the torque transmitting system of the coasting mechanism engages and transmits torque through the drive body to the driven body. When the drive body is not rotating as fast as the driven body, the torque transmitting system of the coasting mechanism disengages the drive body from the driven body so that the driven body can rotate faster than the drive body. The coasting mechanism permits driving force to be transmitted to the wheel when driving force is applied to the drive body, and permits the driven body to rotate when the drive body is not rotating so that the pedals don't necessarily turn when the bicycle is coasting.

According to the invention, a drive body and a driven body are supported in co-axial relationship by special ball bearings so that there is a small gap between a contact surface of the drive body and an adjacent contact surface of the driven body. There is a ratchet and pawl system for transmitting torque from the drive body to the driven body. When more than a relatively small driving force is applied to the drive body, the ball bearings begin to yield and, when a sufficiently large driving force is applied, the ball bearings yield sufficiently to bring the contact surfaces 15 and 16 into engagement to support the drive body and the driven body in nearly co-axial relationship. During coasting, the special ball bearings resume their round shape and resume acting as would normal ball bearings by rolling and allowing low friction relative rotational movement between the drive body and the driven body. When a sufficiently large driving force is applied to the drive body, the special ball bearings elastically deform again, bringing portions of the contact surfaces of the drive body and the driven body again into contact with each other to support the drive body and the driven body relative to each other during torque transmission. The gap between these contact surfaces is small enough that the special balls, during the time when a sufficiently large driving force is applied, deform only a relatively small amount and they are not permanently deformed or otherwise damaged so that, when the driving force load is removed, they spring back to again act as normal ball bearings. These special balls are not strong enough to resist deformation when more than a relatively small driving force is transmitted through the system. When a sufficiently large driving force is transmitted, the special balls yield until portions of the contact surfaces of the drive body and the driven body engage. The bearing raceways can be designed to take advantage of the lower hardness and highly elastic properties of the special balls. The bearing raceways can be machined directly into the light weight aluminum of the driven body and/or the drive body, with only a cone or a plug required to complete the bearing assembly. The coaxial misalignment that is created when the special ball bearings deform is not conducive to simultaneous engagement of multiple drive pawls. Therefore, this mechanism uses a pair of wide pawls which engage only alternately. Each pawl alone is sufficiently strong to transmit the torque generated by the driving force. The pawl can be extra wide and therefore stronger because there is no separate bearing race taking up space inside the mechanism. The ratchet teeth can be coarse and, because of the alternately engaging pawls, the mechanism will behave as if it had twice the number of ratchet teeth that it has. This allows a contact surface to be provided between the tips of the ratchet teeth, without causing there to be large angular gaps between engagement positions, as would otherwise be expected with such coarse ratchet teeth.

In a preferred embodiment, the driven body is the hub body itself and, in that case, it would include bearing sockets for bearings for the rotation of the bicycle wheel on the axle. The hub body would also include means, such as flanges, to receive spokes to support a rim, or surfaces to which a disk wheel might be fastened. The hub body would normally be made from a light and ductile material such as aluminum, or magnesium, or an engineering plastic. The inner bearing race for the coasting mechanism is machined directly into this hub body and the special ball bearings can roll on this raceway without damaging the material of which the hub body is made. The pawl sockets are also formed in this hub body, as well as a contact surface to co-act with a contact surface on the drive body to handle high loads associated with torque transmission. The drive body can be aluminum with the ball raceways machined in for light weight, or it can be made of traditional steel material for lowest cost and extra durability. Both materials will work and each has its advantages and disadvantages. The out board coasting mechanism bearing handles all side loads and can be finished by a cone or, in another embodiment, by a filler slot type bearing. The two pawls are made as wide as practical while still fitting between the bearings and the pawls are held in their sockets, 180 degrees apart, with a resilient member that tends to pivot them into engagement with the ratchet teeth in a conventional manner.

The special ball bearings for the coasting mechanism are made of a resilient material such as plastic or a rubber material. Nylon and urethane rubber are suitable materials. In the case where the out board coasting mechanism bearing is finished with a cone, the cone is preferably cup-shaped, with the bearing raceway formed on its rim, and the cone is screwed into the hub bearing socket, with the hub bearing lightly press fitted into the cone. An alternative embodiment has the outboard bearing race formed with a filler hole or slot to allow the ball bearings for the coaster mechanism bearing to be inserted.

The drive body has an odd number of ratchet teeth such as fifteen or seventeen, with the tips having a contact surface to contact a corresponding hub body contact surface during the application of sufficiently large driving force. With an odd number of ratchet teeth and the pawls spaced at 180 degrees, the pawls will engage alternatingly, i.e., only one pawl will be engaged during torque transmission. During the application of sufficiently large driving force to the mechanism, the resilient ball bearings will flex and the drive body and the driven body will no longer be co-axial, i.e., they will be slightly misaligned and the contact surface of each body will support them relative to each other. During torque transmission, only a single pawl will engage fully and the other pawl will engage not at all.

DETAILED DESCRIPTION OF THE INVENTION

Figure 1:
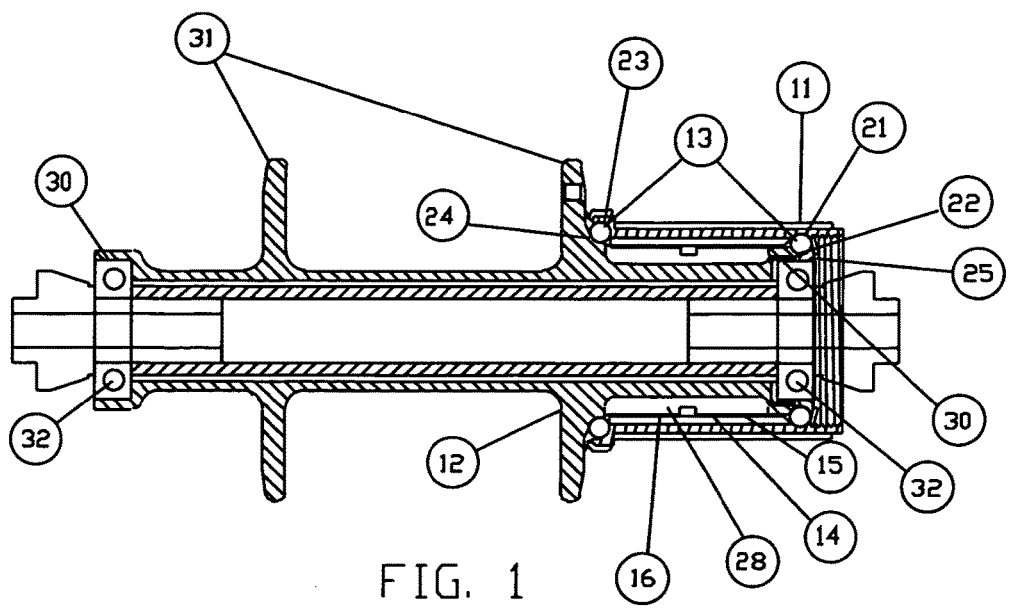
FIG. 1 is a cross sectional view of a hub including a first embodiment of a coasting mechanism according to the present invention.

Referring now to FIG. 1, a hub, indicated generally at 10, including a coaster mechanism, comprises a drive body 11 and a driven body 12, which are supported in spaced, co-axial relationship, for relative rotation, by special ball bearings 13. When driving force is not being transmitted through the hub 10, or only a relatively small driving force is being transmitted, the ball bearings 13 support the drive body 11 and the driven body 12 so that there is a small circumferential gap 14 between an outer contact surface 15 of the driven body 12 and inner contact surfaces 16 of the drive body 11.

Figure 2:
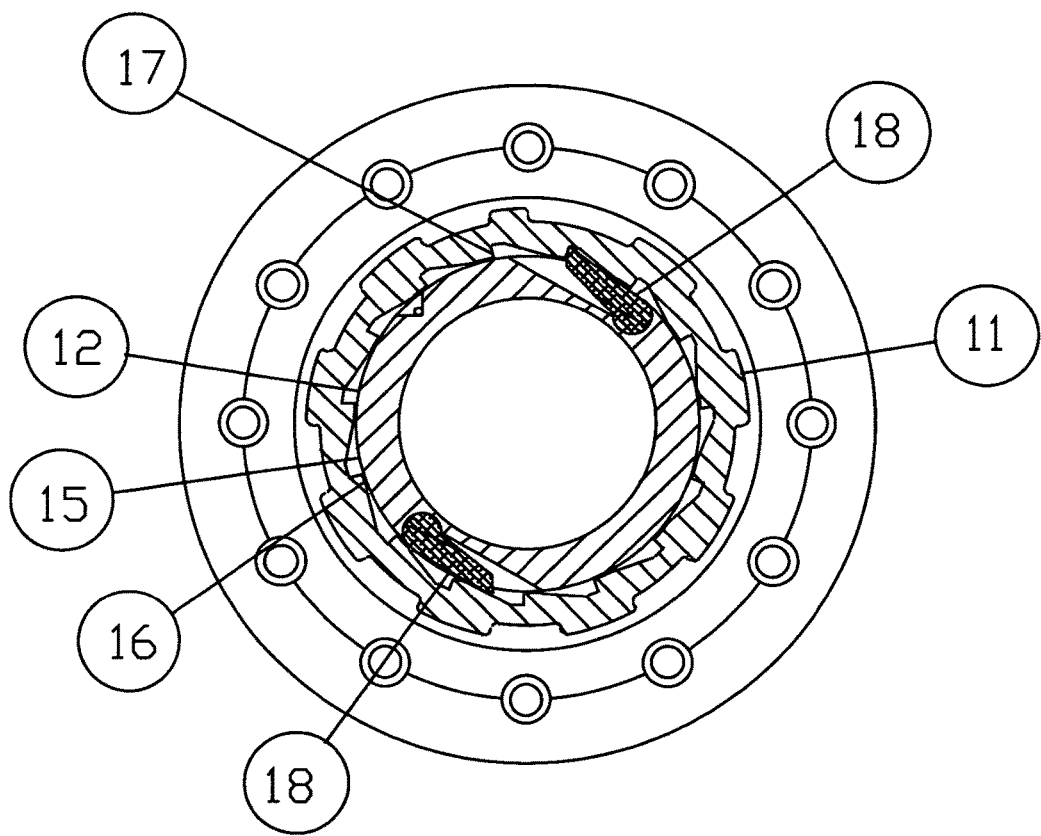
FIG. 2 is a sectional view of a coasting mechanism, according to the present invention, in a coasting mode.

Referring now to FIG. 2, a torque transmission system comprising ratchet teeth 17 and pawls 18 is shown. The torque transmission system is operable, under certain conditions, to transmit torque from the drive body 11 to the driven body 12. When driving force is applied to the drive body 11, one or the other of the two pawls 18 will engage one of the ratchet teeth 17, transmitting torque from the drive body to the driven body 12. During the application of sufficiently large driving force, the ball bearings 13 will be loaded and some of the ball bearings 13 will become compressed. The balls 13 will lose their roundness and they will no longer act as ball bearings. During torque transmission, there is no relative rotation between the drive body 11 and the driven body 12, though, so the ball bearings do not have to act as ball bearings. The compression of some of the ball bearings 13 will bring portions of the contact surfaces 15 and 16 into contact with each other and, through this contact, the drive body 11 and the driven body 12 will be supported relative to each other so that driving force loads will be transmitted from one to the other. The balls 13 will still transmit some of the driving force loads from the drive body 11 to the driven body 12 but, at higher driving forces, driving force loads will be transmitted primarily through the contact surfaces 15 and 16. When driving force is not being applied to the coasting mechanism, i.e., during coasting, or at relatively small levels of applied driving force, the special ball bearings 13 return to or assume their undeformed shape and, in the case of coasting, they resume acting as would normal ball bearings by rolling and allowing low friction rotational movement of the drive body 11 and the driven body 12 relative to each other, while supporting the bodies 11 and 12 in co-axial relationship.

Figure 4:
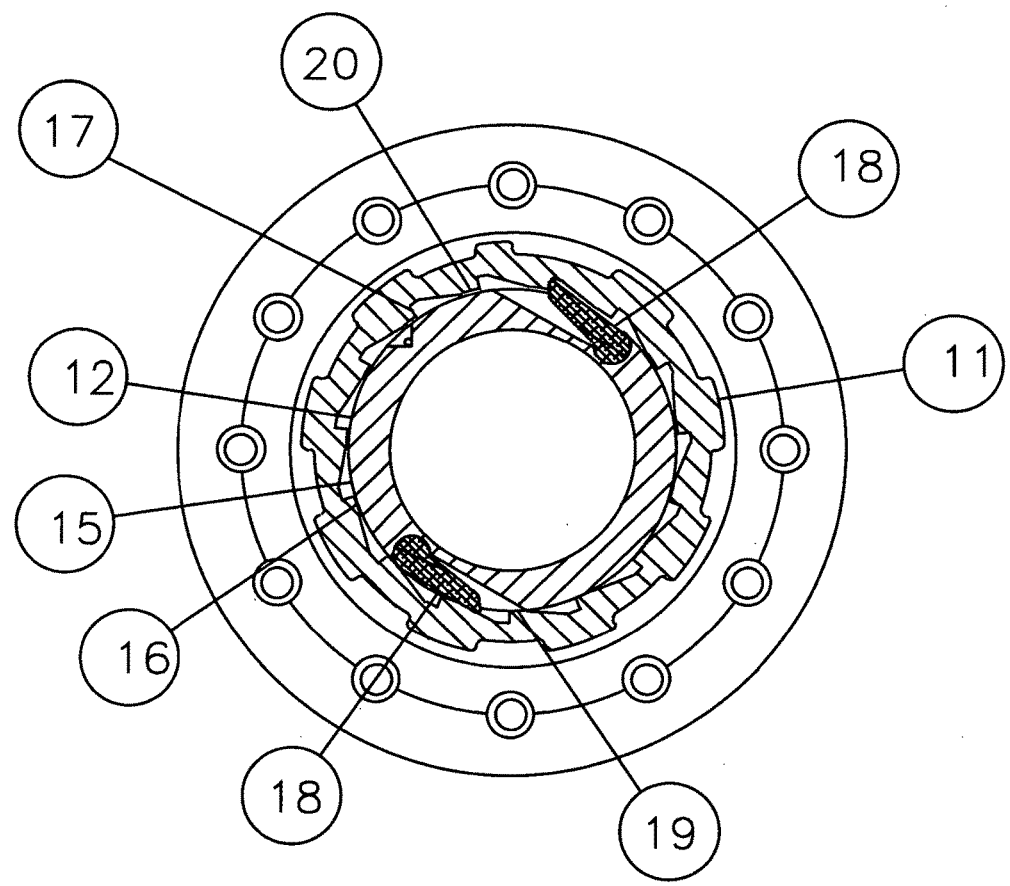
FIG. 4 is a sectional view of the coasting mechanism, according to the present invention, with a substantial driving force applied.

When more than a relatively small driving force is applied to the drive body of the coasting mechanism, the special ball bearings 13 (FIG. 1) begin to elastically deform, throwing off the co-axial alignment between the bodies 11 and 12. When a sufficiently large driving force is applied to the mechanism, the balls 13 will have elastically deformed to the extent, as shown in FIG. 4, where the circumferential gap 14 between contact surfaces 15 and 16 is eliminated at some points, as indicated at 19, and enlarged at some other points, as indicated at 20. Where the gap 14 (FIG. 1) is eliminated, as indicated at 19 (FIG. 4), there is contact between the contact surfaces 15 and 16, through which the high force loads are carried and transmitted from body 11 to body 12. Alternatively or at the same time, the pawl 18 that is not engaged may serve to transmit some of the driving force loads between the drive body 11 and the driven body 12. It can be seen in FIG. 4 that the non-engaged pawl 18 is positioned between the contact surface 16 of the drive body 11 and a pawl pocket surface, not numbered, on the driven body and so, when the bearing elements 13 deform, some driving force loads may be transmitted as between the bodies 11 and 12 through an intermediate element such as the pawl 18. The gap 14 (FIG. 1) between the contact surfaces 15 and 16 is small enough that the special balls 13 have to deform only a relatively small amount before portions of the contact surfaces 15 and 16 engage to support the high force loads generated during the application of a sufficiently large driving force. This relatively small deformation of the balls 13 does not damage them because the loads are transferred to (and through) the contact surfaces 15 and 16 before the elastic limits of the balls 13 are exceeded. When the driving force that is being applied falls below a relatively small threshold, the balls 13 spring back to a round shape again and act as normal ball bearings supporting the bodies 11 and 12 in spaced co-axial relationship for relative rotation during coasting.

Figure 3:
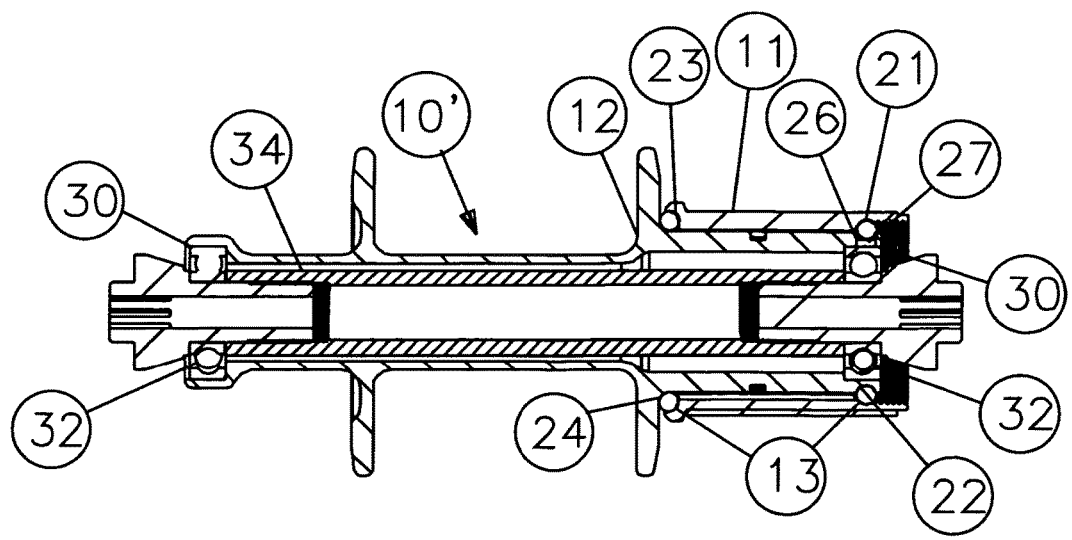
FIG. 3 is a cross sectional view of a hub including a second embodiment of a coasting mechanism, with a different outboard bearing arrangement, according to the present invention.

These special balls 13 are not strong enough or hard enough to support and transfer the sizeable loads seen during when substantial driving force is applied to the coaster mechanism. Consequently, the balls 13 are not hard enough to require hardened ball bearing raceways. Accordingly, in the hub 10, out board bearing raceways 21 and 22 and in board bearing raceways 23 and 24 are machined directly into the light weight aluminum (or engineering plastic or magnesium or other material) of the bodies 11 and 12 so that only a cone 25 is required to complete the bearing assembly between the drive body 11 and the driven body 12. Alternatively, as shown in FIG. 3, in a hub 10', balls 13 can be introduced into the out board bearing through a radially extending filler hole or slot 26 in the driven body 12 and, when the raceway is full, the hole or slot 26 can then be filled with a resilient plug 27 to complete the bearing assembly.

The coaxial misalignment that is provided for in this mechanism when substantial driving forces are applied is not conducive to simultaneous engagement of multiple drive pawls. Therefore this mechanism preferably uses a pair of wide pawls 18 (FIG. 2) that fit into correspondingly wide sockets 28 (FIG. 1) formed in the driven body 12. Each pawl 18 (FIGS. 2 and 4) alone is sufficiently strong to transmit the torque to the driven body 12. The hub 10 accommodates a pawl 18 that can be extra wide and, therefore, stronger because there is no separate bearing race taking up precious space between the bodies 11 and 12. The ratchet teeth 17 (FIG. 2) can be coarse and it is preferred that an odd number of ratchet teeth 17 be provided. With two pawls 18 spaced 180 degrees apart and an odd number of ratchet teeth 17, only one pawl 18 or the other pawl 18, but not both pawls 18, can engage a ratchet tooth 17 during torque transmission. This makes the hub 10 behave as if it had twice the number of ratchet teeth 17 that it actually has. The coarse teeth 17 allow enough space for a contact surface 16 to be provided at the tips of the ratchet teeth 17. A loop spring (not shown) resiliently urges the pawls 18 into engagement with a ratchet tooth 17, in a conventional manner.

In the embodiment shown in FIG. 1, the driven body 12 is the hub body itself, which includes wheel bearing sockets 30 (FIG. 1) and means for connecting the hub 10 to a wheel rim (not shown), such as flanges 31, which can be configured to receive spokes (not shown) or for connection to a disk wheel (not shown). Wheel bearings 32 are received in the bearing sockets 30 for supporting the hub on an axle 34.

As previously mentioned, the drive body 11 can be aluminum with the ball raceways 21 and 23 (FIG. 1) machined directly into it for weight savings. Alternatively, it can be made of traditional steel material for lowest cost and extra durability. Either material will work; each material has its advantages and disadvantages.

The balls 13 (FIG. 1) for the coasting mechanism are resilient and may be made of a plastic or rubber material such as Nylon or urethane rubber. There are myriad other resilient materials with a suitable range of elastic deformation to work in the hub 10.

While two preferred embodiments are discussed and described above in detail and shown in the accompanying drawings, other embodiments incorporating the spirit and scope of the invention will no doubt occur to those who work in this field. For example, rollers may be substituted for the special balls. Also, the number of ratchet teeth and/or pawls may be increased or decreased. Further, the driven body and the hub body can be integral but separating them does not detract from the nature or purpose of the invention. Indeed, these and other modifications can be made by anyone in this field without departing from the spirit and scope of the invention, as defined in the appended claims.

What is claimed is:

1. A bicycle coasting mechanism including a one way torque transmitting drive system, said one way torque transmitting drive system comprising:
   a drive body with bearing races and a contact surface;
   a driven body with matching bearing races and a contact surface; and
   elastically flexible rolling bearing elements in said bearing races that support a gap between said contact surfaces during coasting,
   wherein at least one of said drive body and driven body are made of a light weight material comprising aluminum, magnesium, or engineering plastic with integral bearing races, and wherein said rolling element bearings are made of plastic or rubber; said rolling bearing elements are elastically flexible enough to not damage the light weight material forming the bearing races;
   wherein during the application of a sufficiently high driving force to the drive body in a first direction, said bearing elements flex sufficiently to close said gap, the one way torque transmitting system engages the drive body with the driven body so that the contact surfaces of the drive body and the driven body contact each other and do not slide relative to each other, and driving force loads are primarily transferred through said contact surfaces, and the one way torque transmitting system transfers torque created from said driving force from the drive body to the driven body in one direction; and
   wherein the one way torque transmitting system disengages the drive body from the driven body, and said bearing elements spring back, without damage, with removal of said driving force, to act as rolling element bearings during coasting in the direction opposite that of the one way torque transmitting drive system.

2. The bicycle coasting mechanism according to claim 1 wherein the one way torque transmitting system is tolerant of axial misalignment that occurs when there is contact between said at least one drive body contact surface and said at least one driven body contact surface.

3. The bicycle coasting mechanism according to claim 1 wherein said driven body constitutes a bicycle wheel hub body.

4. The bicycle coasting mechanism according to claim 2 wherein said one way torque transmitting system is a ratchet tooth and pawl system and wherein each pawl in said system is strong enough, by itself, to transmit the driving torque load.

5. The bicycle coasting mechanism according to claim 4 wherein said one way torque transmitting system comprises a plurality of pawls and a plurality of ratchet teeth and wherein only a single pawl engages a ratchet tooth during torque transmission.

6. The bicycle coasting mechanism according to claim 5 wherein said ratchet teeth are coarse and there is a land on each tooth tip which constitutes one of said contact surfaces.

7. The bicycle coasting mechanism according to claim 1 wherein there are inboard and outboard bearing races and wherein a hole or a filler slot is provided through which said rolling element bearings may be initially placed in said outboard bearing races.

8. The bicycle coasting mechanism according to claim 1 which further comprises an intermediate element between said drive body and said driven body and through which at least some driving force loads are transmitted.

9. A bicycle coasting mechanism including a one way torque transmitting drive system, said one way torque transmitting drive system comprising:
 a drive body comprising bearing races and at least one contact surface;
 a driven body comprising bearing races that cooperate with said bearing races of said drive body to form bearing raceways, and further comprising at least one contact surface; and
 elastically flexible rolling bearing elements in said bearing raceways,
  wherein at least one of said drive body and driven body are made of a light weight material comprising aluminum, magnesium, or engineering plastic with integral bearing races, wherein said rolling element bearings are made of plastic or rubber; said rolling element bearings are elastically flexible enough to not damage said light weight material forming the bearing races,
  wherein when a sufficiently large driving force is being applied to said drive body in a first direction, said bearing elements are elastically deformed enough so that at least one contact surface of said drive body makes contact with said at least one contact surface of said driven body, whereby the at least one contact surface of said drive body and the at least one contact surface of said driven body do not slide relative to each other, such engagement supports said drive body and said driven body, relative to each other, and driving force loads are transmitted from said drive body to said driven body in one direction,
 wherein when no driving force or a very low level of driving force is being applied to said drive body, said drive body does not contact said driven body, and said bearing elements support said drive body and said driven body in co-axial or nearly co-axial relationship, with a gap between said at least one contact surface of said drive body and said at least one contact surface of said driven body, and
 wherein, when coasting happens, there is no driving force and the relative motion between said contact surface of said drive body and said contact surface of said driven body happens without contact across the said gap.

10. The bicycle coasting mechanism according to claim 9 wherein said one way torque transmitting system is tolerant of axial misalignment that occurs when there is contact between said contact surfaces.

11. The bicycle coasting mechanism according to claim 9 wherein said driven body constitutes a bicycle wheel hub body.

12. The bicycle coasting mechanism according to claim 9 wherein said one way torque transmitting system is a ratchet tooth and pawl system and wherein each pawl in said system is strong enough, by itself, to transmit the driving torque load.

13. The bicycle coasting mechanism according to claim 12 wherein said one way torque transmitting system comprises a plurality of pawls and a plurality of ratchet teeth and wherein only a single pawl engages a ratchet tooth during torque transmission.

14. The bicycle coasting mechanism according to claim 13 wherein said ratchet teeth are coarse and there is a land on each tooth tip which acts as one of said contact surfaces.

15. The bicycle coasting mechanism according to claim 9 wherein there are inboard and outboard bearing races and wherein a hole or a filler slot is provided through which said rolling element bearings may be initially placed in said outboard bearing races.

16. A bicycle coasting mechanism including a one way torque transmitting system, said torque transmitting system comprising:
 a drive body with bearing races and at least one contact surface;
 a driven body with cooperating bearing races and at least one contact surface; and
 elastically flexible rolling bearing elements in said bearing races that support at least one gap between said at least one drive body contact surface and said at least one driven body contact surface during coasting,
  wherein at least one of said drive body and driven body are made of a light weight material comprising aluminum, magnesium, or engineering plastic with integral beating races, and wherein said rolling element bearings are made of plastic or rubber,
 wherein said rolling bearing elements are elastically flexible enough to not damage said light weight material forming the bearing races,
 wherein when a sufficiently high driving force is applied to said drive body in one direction, said bearing elements flex sufficiently to close said at least one gap so that the contact surfaces of the drive body and the driven body contact each other and do not slide relative to each other, and driving force loads are primarily transferred through said contact surfaces, and the one way torque transmitting system transfers torque from the drive body to the driven body in one direction;
 wherein driving force loads in excess of said sufficiently high driving forces are transferred through said at least one drive body contact surface to said at least one driven body contact surface; and
 wherein the one way torque transmitting system disengages the drive body from the driven body, and said bearing elements spring back when the drive loads are removed to resume acting as rolling bearing elements in the opposite direction.

17. The bicycle coasting mechanism according to claim 16 in which the one way torque transmitting system is tolerant of axial misalignment that occurs when there is contact between said at least one drive body contact surface and said at least one driven body contact surface.

18. The bicycle coasting mechanism according to claim 16 which further comprises an intermediate element between said drive body and said driven body and through which at least some driving force loads are transmitted.

* * * * *